US008966555B2

(12) United States Patent
Pham et al.

(10) Patent No.: US 8,966,555 B2
(45) Date of Patent: Feb. 24, 2015

(54) METHOD AND SYSTEM FOR PERFORMANCE MONITORING OF NETWORK TERMINAL DEVICES

(75) Inventors: Hung John Pham, Cedar Park, TX (US); John Clayton Clark, IV, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 756 days.

(21) Appl. No.: 12/882,526

(22) Filed: Sep. 15, 2010

(65) Prior Publication Data

US 2012/0066735 A1     Mar. 15, 2012

(51) Int. Cl.
| | | |
|---|---|---|
| H04N 7/173 | (2011.01) |
| G06F 5/00 | (2006.01) |
| H04N 21/24 | (2011.01) |
| H04H 60/32 | (2008.01) |
| H04N 21/647 | (2011.01) |
| H04H 20/40 | (2008.01) |

(52) U.S. Cl.
CPC ........... *H04N 21/2401* (2013.01); *H04H 60/32* (2013.01); *H04N 21/64723* (2013.01); *H04H 20/40* (2013.01)
USPC .............................................. 725/94; 710/52

(58) Field of Classification Search
CPC ....................... H04N 21/44004; H04N 5/0736
USPC ................. 725/124, 125, 94; 710/52
See application file for complete search history.

(56) References Cited

U.S. PATENT DOCUMENTS

| | | | |
|---|---|---|---|
| 4,472,678 A * | 9/1984 | Lauriello ...................... 324/72.5 |
| 5,557,437 A | 9/1996 | Sakai et al. |
| 5,710,942 A | 1/1998 | Nakagaki et al. |
| 5,896,504 A | 4/1999 | Shiraki |
| 6,078,649 A | 6/2000 | Small et al. |
| 6,088,588 A | 7/2000 | Osborne |
| 6,233,542 B1 | 5/2001 | Butts et al. |
| 6,314,476 B1 | 11/2001 | Ohara |
| 7,061,889 B2 | 6/2006 | Nakayasu |
| 7,447,752 B2 | 11/2008 | Matsune et al. |
| 7,463,624 B2 | 12/2008 | Kitazawa |
| 7,730,344 B1 * | 6/2010 | Perozo .......................... 714/6.13 |
| 7,787,483 B2 | 8/2010 | Vanderhaegen et al. |
| 7,929,971 B2 | 4/2011 | Lucidarme et al. |
| 7,933,979 B2 | 4/2011 | Matsune |
| 8,159,960 B2 * | 4/2012 | Cooppan ....................... 370/252 |
| 2001/0048666 A1 | 12/2001 | Nakayasu |
| 2002/0028696 A1 | 3/2002 | Hirayama et al. |
| 2002/0183598 A1 | 12/2002 | Teraura et al. |
| 2004/0096215 A1 | 5/2004 | Evangelides, Jr. et al. |
| 2004/0128376 A1 | 7/2004 | Matsune et al. |

(Continued)

*Primary Examiner* — Nasser Goodarzi
*Assistant Examiner* — Michael Hong
(74) *Attorney, Agent, or Firm* — Jackson Walker L.L.P.

(57) ABSTRACT

A method and system for performance monitoring of a multimedia content distribution network (MCDN) includes a probe device configured to capture input and output data with respect to a network terminal device at an MCDN client premises. The input data, representing network data sent to the MCDN client for display, may be buffered along with the output data, representing audio and video data generated using the input data. When an anomaly event, such as a display error, occurs, the probe device may record the buffered input and output data, including data acquired prior to the anomaly event. The input and output data may be analyzed to determine a source or origin of the anomaly event. The probe device may also certify that the MCDN and/or the network terminal device was operating normally.

19 Claims, 7 Drawing Sheets

(56) References Cited

U.S. PATENT DOCUMENTS

| | | |
|---|---|---|
| 2004/0196793 A1 | 10/2004 | Lucidarme et al. |
| 2004/0204244 A1 | 10/2004 | Rathsack et al. |
| 2005/0036450 A1 | 2/2005 | Arimori et al. |
| 2005/0114497 A1 | 5/2005 | Mani et al. |
| 2005/0255828 A1 | 11/2005 | Fisher |
| 2006/0258365 A1 | 11/2006 | Cha et al. |
| 2007/0015973 A1 | 1/2007 | Nanikashvili |
| 2007/0058546 A1 | 3/2007 | Na |
| 2007/0211680 A1 | 9/2007 | Laroia et al. |
| 2008/0165838 A1 | 7/2008 | Vanderhaegen et al. |
| 2009/0052889 A1 | 2/2009 | McKelvey et al. |
| 2009/0064248 A1* | 3/2009 | Kwan et al. .................. 725/109 |
| 2009/0067394 A1 | 3/2009 | Van Wingerde |
| 2009/0089832 A1* | 4/2009 | Kendall .......................... 725/38 |
| 2009/0112968 A1 | 4/2009 | Matsune et al. |
| 2009/0167504 A1 | 7/2009 | Mukaigawa et al. |
| 2009/0286526 A1 | 11/2009 | Matsunaga |
| 2010/0013921 A1 | 1/2010 | Joko et al. |
| 2011/0076946 A1 | 3/2011 | Hillebrand et al. |
| 2011/0153651 A1 | 6/2011 | Kim et al. |

* cited by examiner

METHOD AND SYSTEM FOR PERFORMANCE MONITORING OF NETWORK TERMINAL DEVICES

FIELD OF DISCLOSURE

The present disclosure relates to network monitoring and, more particularly, to performance monitoring of network terminal devices.

BACKGROUND

Performance monitoring of a multimedia content distribution network may involve monitoring and capturing multimedia signals generated by a network terminal device. For example, video signals may be monitored for quality control of images and soundtrack. In some cases, however, performance monitoring at the output of a network terminal device may not provide sufficient information to ascertain whether the network terminal device is operating normally.

DETAILED DESCRIPTION

Figure 1:
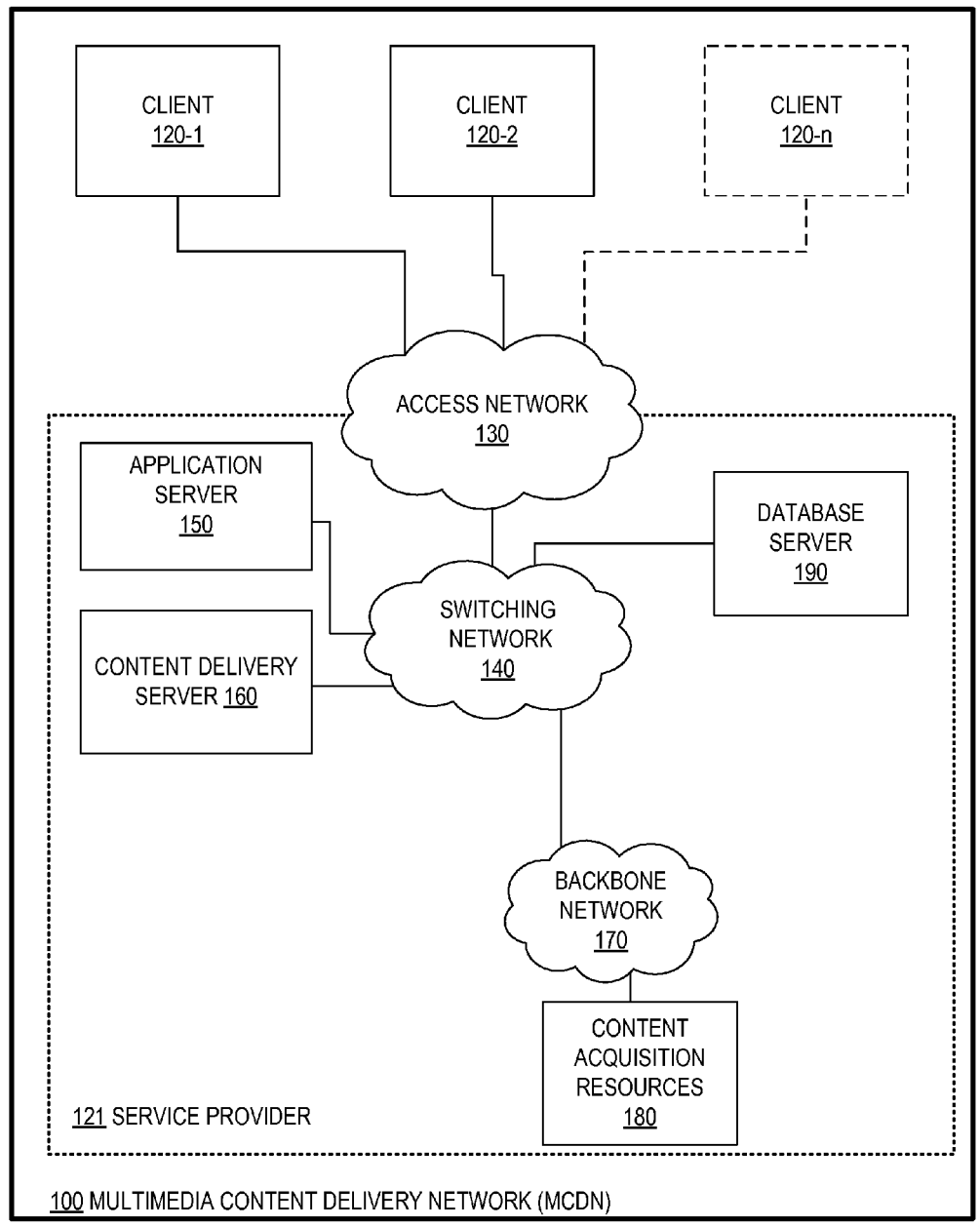
FIG. 1 is a block diagram of selected elements of an embodiment of a multimedia content distribution network.

In one aspect, a disclosed method for monitoring performance of a multimedia content distribution network (MCDN) includes buffering multimedia handling device (MHD) input data to a first data buffer at an MCDN client premises. The method further includes buffering, to a second data buffer, MHD output data representing a multimedia output signal generated by the MHD when the MHD receives the MHD input data. The MHD input data may represent multimedia content. When an anomaly event is detected in the buffered MHD output data, the method may further include storing at least some of the first data buffer and at least some of the second data buffer in non-volatile storage. In some embodiments, storing may include recording MHD input data and MHD output data buffered prior to detecting the anomaly event.

If an anomaly event is detected in the buffered MHD output data during a predetermined interval, the method may further include certifying that the MHD is operating normally. If an anomaly event occurs, the method may further include analyzing the recorded MHD input data for an indication of the anomaly event in the MHD input data. When analyzing the recorded MHD input data does not reveal an indication of the anomaly event, the method may also include certifying, based on the recorded MHD input data, that the network data was properly provided to the MHD via the MCDN. The MHD output data may include video and audio data. The method may further include characterizing the anomaly event using the recorded MHD output data. The anomaly event may represent video distortion, audio distortion, video freeze, a pixelation error, an MHD failure, or another anomaly.

In some embodiments, characterizing the anomaly event may include determining a time duration associated with the anomaly event. The method may also include buffering MHD client data sent by the MHD to an MCDN server and using the recorded MHD client data and the recorded MHD input data to detect the anomaly event. The recording may include the MHD client data. In response to detecting an anomaly event, the method may send a notification of the detected anomaly event via email.

In another aspect, a computerized probe device for monitoring the performance of an MHD includes a processor coupled to memory media, a first network adapter for coupling to the MCDN, a second network adapter for coupling to the MHD, and a multimedia signal grabber for acquiring audio and video data. The memory media may include software (i.e., processor executable instructions) to transmit network data received at the first network adapter from the MCDN to the MHD via the second network adapter, to capture the network data to a network data buffer, and to capture, using the multimedia signal grabber, audio and video data from a multimedia display signal generated by the MHD to a multimedia display data buffer. The probe may also include instructions to analyze the captured audio and video data for an anomaly event. The anomaly event may represent a video distortion, an audio distortion, a video freeze, a pixelation error, or an MHD failure.

In particular embodiments, the probe may include instructions to record, to non-volatile storage, at least some of the network data buffer and at least some of the multimedia display data buffer captured prior to detecting the anomaly event. Recording to non-volatile storage may be performed in response to detecting an anomaly event in the captured audio and video data. When no anomaly event is detected in the captured audio and video data during a predetermined interval, the probe may certify, based on the acquired audio and video data, that the MHD is operating normally.

In some embodiments, the probe may include instructions to analyze the recorded network data for an indication of the anomaly event in the network data. When no indication of the anomaly event is revealed, certify, based on the recorded network data, that the network data were properly provided to the MHD. The probe may determine a time duration associated with the anomaly event.

In certain embodiments, the probe device includes a local transceiver, executable instructions to send a remote control command to the MHD via the local transceiver and to analyze the audio and video data for a response to the remote control command. The probe device may also include a wireless interface and executable instructions to receive, via the wireless interface, multimedia display signals from a plurality of MHDs, and to capture a plurality of audio and video data sets from the multimedia display signals.

In yet another aspect, a disclosed computer-readable memory media includes executable instructions for monitoring an MCDN. The instructions may buffer, to a first data buffer at an MCDN client premises, input data for an MHD. The MHD input data may represent multimedia content for output by the MHD. The instructions may also buffer, to a second data buffer, MHD output data representing a multimedia output signal generated by the MHD in response to receiving the MHD input data, and scan the buffered MHD output data to detect an anomaly event. Upon detecting an anomaly event, the instructions may record, to non-volatile storage, at least some of the MHD input data and at least some of the MHD output data buffered prior to detecting the anomaly event.

In given embodiments, the instructions may analyze the recorded MHD input data for an indication of the anomaly event in the MHD input data. When the analyzed MHD input data does not reveal an indication of the anomaly event in the MHD input data, the instructions may certify, based on the recorded MHD input data, that the MHD input data was properly provided to the MHD via the MCDN. When no anomaly event is detected in the MHD output data, the instructions may certify, based on the buffered MHD output data, that the MHD is operating normally.

In some embodiments, the MHD output data includes video and audio data and the instructions may characterize the anomaly event using the recorded MHD output data. The anomaly event may represent a video distortion, an audio distortion, a video freeze, a pixelation error, or an MHD failure. The instructions may send a multimedia test pattern for generating a multimedia test signal to the MHD and scan the MHD output data to verify the multimedia test pattern. When the multimedia test pattern is not verified, the instructions may determine the anomaly event based on the multimedia test pattern. The instructions may also send a remote control command to the MHD and scan the MHD output data for an expected response to the remote control command. When the expected response to the remote control command is not detected in the MHD output data, the instructions may determine the anomaly event based on the remote control command.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1 is a block diagram illustrating selected elements of an embodiment of MCDN 100. Although functionality for delivering TV, video on demand (VOD), or pay-per-view (PPV) programs is emphasized in the depicted embodiments of MCDN 100; MCDN 100 may also include resources for delivering voice/telephony services (e.g., VOIP services), Internet/data services (e.g., Web/email services), or any combination of multimedia, voice, and data service. In this disclosure, multimedia content may be interchangeably referred as "multimedia content", "multimedia content programs", "multimedia programs" or, simply, "programs." MCDN 100 represents an environment into which a performance monitoring probe device (not depicted in FIG. 1) described below may be implemented.

The elements of MCDN 100 illustrated in FIG. 1 are configured for delivering multimedia content to a set of one or more subscribers. It is noted that different embodiments of MCDN 100 may include additional elements or systems (not shown in FIG. 1 for clarity) as desired for additional functionality, such as data processing systems for billing, content management, customer support, operational support, or other business applications.

As depicted in FIG. 1, MCDN 100 includes one or more clients 120 and a service provider 121. Each client 120 may represent a different subscriber of MCDN 100. In FIG. 1, a plurality of n clients 120 is depicted as client 120-1, client 120-2 to client 120-n, where n may be a large number. Service provider 121 as depicted in FIG. 1 encompasses resources to acquire, process, and deliver programs to clients 120 via access network 130. Such elements in FIG. 1 of service provider 121 include content acquisition resources 180 connected to switching network 140 via backbone network 170, as well as application server 150, database server 190, and content delivery server 160, also shown connected to switching network 140.

In the depicted implementation, access network 130 demarcates clients 120 and service provider 121 and provides at least one connection path between clients 120 and service provider 121. In some embodiments, access network 130 is an Internet protocol (IP) compliant network. It is noted that in some embodiments of MCDN 100, access network 130 is owned and/or operated by service provider 121. In other embodiments, a third party may own and/or operate at least a portion of access network 130.

In some embodiments of access network 130, access network 130 may include a physical layer of unshielded twisted pair cables, fiber optic cables, coaxial cable or a combination thereof connecting clients 120 to some form of node (not depicted) in access network 130, where the node might be a digital subscriber line access multiplexer (DSLAM), a central office, a service area interface (SAI), or the like. Fiber, cable, or another broadband medium may connect service provider resources to the node. In other embodiments, the broadband cable may extend all the way to clients 120. In certain embodiments, fiber optic cables may be provided from an access node network to each individual client 120. The connections between access network 130 and clients 120 may include digital line subscriber (DSL) connections. In these embodiments, the DSL connections may be DSL-compliant twisted pair or another type of galvanic loop (see also FIG. 4).

As depicted in FIG. 1, switching network 140 provides connectivity for service provider 121 and may be housed in a central office or other facility of service provider 121. Switching network 140 may provide firewall and routing functions to demarcate access network 130 from the resources of service provider 121. In embodiments that employ DSL-compliant connections, switching network 140 and/or access network 130 may include elements of a DSLAM that multiplexes many subscriber DSLs to backbone network 170 (see also FIG. 4).

In FIG. 1, backbone network 170 represents a private network including, as an example, a fiber-based network to accommodate high data transfer rates. Content acquisition resources 180 as depicted in FIG. 1 encompass the acquisition of various types of content including broadcast content, other "live" content including national content feeds, and VOD content.

The content provided by service provider 121 may thus encompass multimedia content that is scheduled in advance for viewing by clients 120 via access network 130. Such multimedia content, also referred to herein as "scheduled programming," may be selected using an electronic programming guide (EPG), such as EPG 316 described below with respect to FIG. 3. Accordingly, a user of MCDN 100 may be able to browse scheduled programming in advance of the broadcast date and time. Some scheduled programs may be "regularly" scheduled programs, which recur at regular intervals or at the same periodic date and time (i.e., daily, weekly, monthly, etc.). Programs that are broadcast at short notice or interrupt scheduled programs are referred to herein as "unscheduled programming."

Acquired content is provided to content delivery server 160 via backbone network 170 and switching network 140. Content may be delivered from content delivery server 160 to clients 120 via switching network 140 and access network 130. Content may be compressed, encrypted, modulated, demodulated, and otherwise encoded or processed at content acquisition resources 180, content delivery server 160, or both. Although FIG. 1 depicts a single element encompassing acquisition of all content, different types of content may be acquired via different types of acquisition resources. Similarly, although FIG. 1 depicts a single content delivery server 160, different types of content may be delivered by different servers. Moreover, embodiments of MCDN 100 may include content acquisition resources in regional offices that are connected to switching network 140.

Service provider 121 is depicted in FIG. 1 as having switching network 140 to which content acquisition resources 180, content delivery server 160, and application server 150 are connected. Other embodiments, however, may employ different switching networks for each of these functional components and may include additional functional components (not depicted in FIG. 1) including, for example, operational subsystem support (OSS) resources.

FIG. 1 also illustrates application server 150 connected to switching network 140. As suggested by its name, application server 150 may host or otherwise implement one or more applications for MCDN 100. Application server 150 may be any data processing system with associated software that provides applications for clients or users. Application server 150 may provide services including multimedia content services, e.g., EPGs, digital video recording (DVR) services, VOD programs, PPV programs, IPTV portals, digital rights management (DRM) servers, navigation/middleware servers, conditional access systems (CAS), and remote diagnostics, as examples.

Applications provided by application server 150 may be downloaded and hosted on other network resources including, for example, content delivery server 160, switching network 140, and/or on clients 120. Application server 150 is configured with a processor and storage media (not shown in FIG. 1) and is enabled to execute processor instructions, such as those included within a software application. As depicted in FIG. 1, application server 150 may be configured to include various applications (not shown in FIG. 1) that may provide functionality to clients 120.

Further depicted in FIG. 1 is database server 190, which provides hardware and software resources for data warehousing. Database server 190 may communicate with other elements of the resources of service provider 121, such as application server 150 or content delivery server 160, in order to store and provide access to large volumes of data, information, or multimedia content. In some embodiments, database server 190 includes a data warehousing application, accessible via switching network 140, that can be used to record and access structured data, such as program or channel metadata for clients 120. Database server 190 may also store device information, such as identifiers for client 120, model identifiers for remote control devices, identifiers for peripheral devices, etc.

Figure 2:
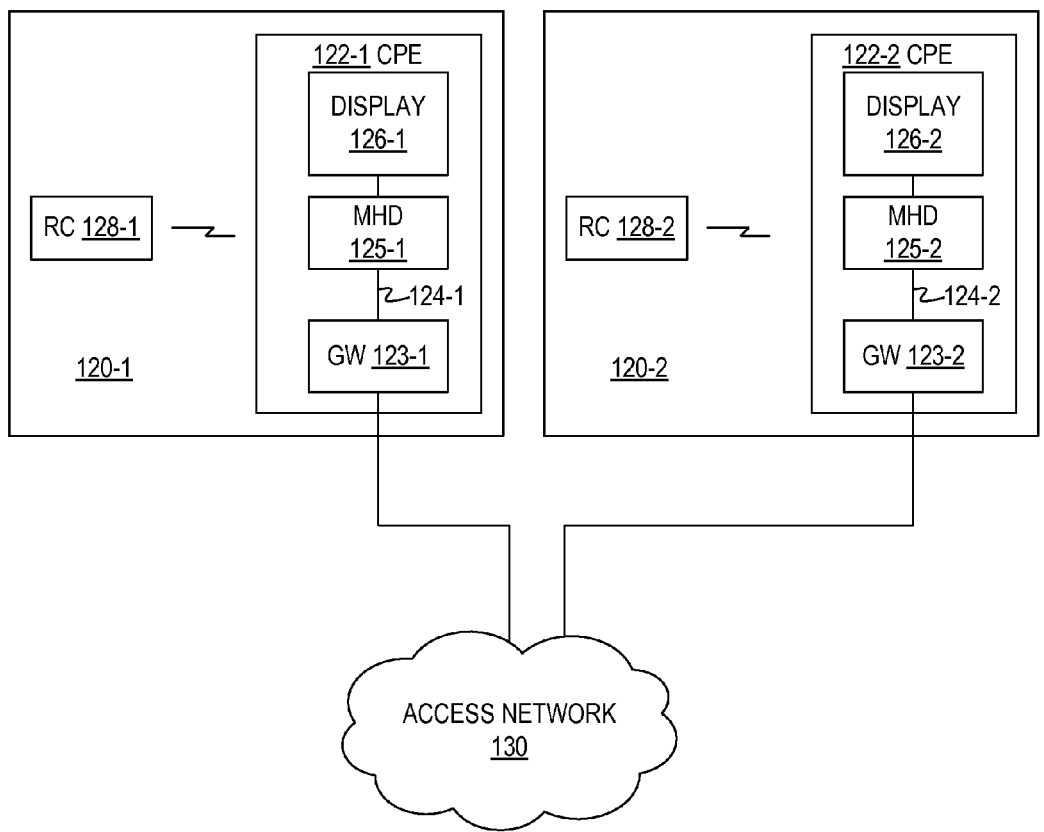
FIG. 2 is a block diagram of selected elements of an embodiment of a multimedia content distribution network.

Turning now to FIG. 2, the clients 120 of MCDN 100 as depicted in FIG. 1 are shown in additional detail. Clients 120 may include network appliances collectively referred to herein as client premises equipment (CPE) 122. In the depicted embodiment, CPE 122 includes gateway (GW) 123, MHD 125, and display device 126. Any combination of GW 123, MHD 125, and display device 126 may be integrated into a single physical device. Thus, for example, CPE 122 might include a single physical device that integrates GW 123, MHD 125, and display device 126. As another example, MHD 125 may be integrated into display device 126, while GW 123 is housed within a physically separate device. It is noted that MHD 125 may serve as a terminal network device in MCDN 100 (see also FIG. 1) for receiving multimedia content and outputting the multimedia content to an MCDN user (not shown in FIG. 2), for example, in the form of audio and video content. Client 120 is suitable for exercising performance monitoring functions provided by a probe device described below with respect to FIG. 3.

In FIG. 2, GW 123 provides connectivity between client 120 and access network 130. GW 123 provides an interface and conversion function between access network 130 and client-side local area network (LAN) 124. GW 123 may include elements of a conventional DSL or cable modem. GW 123, in some embodiments, may further include routing functionality for routing multimedia content, conventional data content, or a combination of both in compliance with IP or another network layer protocol. In some embodiments, LAN 124 may encompass or represent an IEEE 802.3 (Ethernet) LAN, an IEEE 802.11-type (WiFi) LAN, or a combination thereof. GW 123 may still further include WiFi or another type of wireless access point to extend LAN 124 to wireless-capable devices in proximity to GW 123. GW 123 may also provide a firewall (not depicted) between clients 120 and access network 130.

Clients 120 as depicted in FIG. 2 further include a display device or, more simply, a display 126. Display 126 may be implemented as a TV, a liquid crystal display screen, a computer monitor, or the like. Display 126 may comply with a display standard for computer monitors and/or television displays. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard. Display 126 may include one or more integrated speakers to play audio content.

Clients 120 are further shown to include a remote control 128, which is configured to control the operation of MHD 125 by means of a user interface (not shown in FIG. 2) invoked through MHD 125 and displayed on display 126. Remote control 128 of client 120 is operable to communicate requests or commands wirelessly to MHD 125 using infrared (IR) or radio frequency (RF) signals. MHDs 125 may also receive requests or commands via buttons (not depicted) located on side panels of MHDs 125.

In some embodiments, remote control 128 may represent a device that is configured to control multiple pieces of equipment. When the equipment controlled by remote control 128 changes, remote control 128 may be reprogrammed, for example, to add a new device. Remote control 128 may be programmed using a local transceiver (see FIG. 3) coupled to CPE 122.

MHD 125 is enabled and configured to process incoming multimedia signals to produce audio and visual signals suitable for delivery to display 126 and any optional external speakers (not depicted in FIG. 2). Incoming multimedia signals received by MHD 125 may be compressed and/or encrypted, digital or analog, packetized for delivery over packet-switched embodiments of access network 130 or modulated for delivery over cable-based access networks. In some embodiments, MHD 125 may be implemented as a stand-alone set top box suitable for use in a co-axial or IP-based MCDN.

Figure 3:
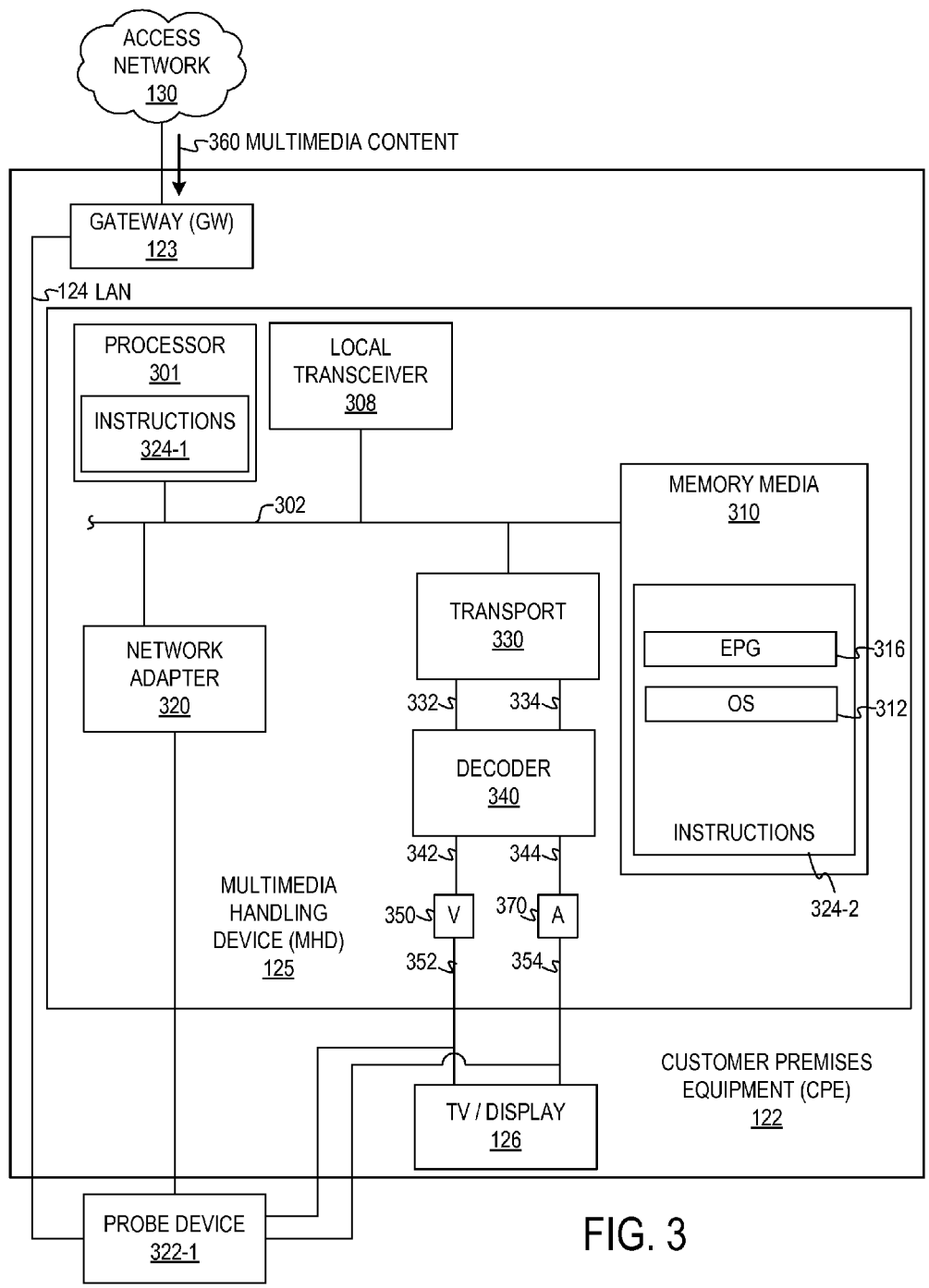
FIG. 3 is a block diagram of selected elements of an embodiment of a multimedia handling device.

Referring now to FIG. 3, a block diagram illustrating selected elements of an embodiment of MHD 125 is presented in combination with a disclosed embodiment of a performance monitoring probe device 322. In FIG. 3, MHD 125 is shown as a functional component of CPE 122 along with GW 123 and display 126, independent of any physical implementation, as discussed above with respect to FIG. 2. In particular, it is noted that CPE 122 may be any combination of GW 123, MHD 125 and display 126. In addition, probe device 322-1 is depicted in FIG. 3 as external to CPE 122. This embodiment encompasses a portable or stand-alone probe device that is configured to connect to pre-existing CPE 122. In other embodiments, all or portions of probe device 322 may be integrated within CPE 122 and/or MHD 125.

In the embodiment depicted in FIG. 3, MHD 125 includes processor 301 coupled via shared bus 302 to storage media, collectively identified as memory media 310. MHD 125, as depicted in FIG. 3, further includes network adapter 320 that interfaces MHD 125 to LAN 124 and through which MHD 125 receives multimedia content 360. GW 123 is shown providing a bridge between access network 130 and LAN 124, and receiving multimedia content 360 from access network 130.

In embodiments suitable for use in IP-based content delivery networks, MHD 125, as depicted in FIG. 3, may include transport unit 330 that assembles the payloads from a sequence or set of network packets into a stream of multimedia content. In non-IP access networks, content may be delivered as a stream that is not packet-based and it may not be necessary in these embodiments to include transport unit 330. In some of these implementations, however, clients 120 may require tuning resources (not explicitly depicted in FIG. 3) to "filter" desired content from other content that is simultaneously delivered over the access network medium and these tuners may be provided in MHDs 125. The packets received by transport unit 330 may include audio information and video information (as well as control data and/or metadata) and transport unit 330 may parse or segregate the audio and video to generate video stream 332 and audio stream 334 as shown.

Video stream 332 and audio stream 334, as output from transport unit 330, may include audio or video information that is compressed, encrypted, or both. A decoder unit 340 is shown receiving video and audio streams 332 and 334 and generating native format video and audio streams 342 and 344. Decoder 340 may employ any of various widely distributed video decoding algorithms including, as examples, any of the Motion Pictures Expert Group (MPEG) standards or Windows Media Video (WMV) standards including WMV 9, which has been standardized as Video Codec-1 (VC-1) by the Society of Motion Picture and Television Engineers. Similarly decoder 340 may employ any of various audio decoding algorithms including, as examples, Dolby® Digital, Digital Theatre System (DTS) Coherent Acoustics, or Windows Media Audio (WMA).

The native format video and audio streams 342 and 344 as shown in FIG. 3 may be processed by encoders/digital-to-analog converters (encoders/DACs) 350 and 370 respectively to produce analog video and audio signals 352 and 354 in a format compliant with display 126, which itself may or may not be a part of MHD 125.

Memory media 310 encompasses persistent and volatile media, fixed and removable media, and magnetic and semiconductor media. Memory media 310 is operable to store executable instructions 324, data (not shown in FIG. 3), or both. Memory media 310 may data include and/or sets or sequences of instructions 324-2 including an operating system 312 and EPG 316. Operating system 312 may be a UNIX or UNIX-like operating system, a Windows® family operating system, or another suitable operating system. In some embodiments, memory media 310 is configured to store and execute instructions provided to client 120 by application server 150. Instructions 324 may also reside, completely or at least partially, within processor 301 during execution thereof. It is further noted that processor 301 may be configured to receive instructions 324-2 from memory media 310 via shared bus 302.

EPG 316 represents instructions and a corresponding data set to provide a user-friendly electronic guide to the multimedia content provided to client 120 via MCDN 100, and may be shown to the user in conjunction with an EPG user interface. The user interface may include a plurality of menu items arranged according to one or more menu layouts, which enable a user to operate MHD 125. The user may operate the user interface, including EPG 316, using remote control 128 (see FIG. 2).

Local transceiver 308 represents an interface of MHD 125 for communicating with external devices, such as remote control 128, or another remote control device. Local transceiver 308 may provide a mechanical interface for coupling to an external device, such as a plug, socket, or other proximal adapter. In some cases, local transceiver 308 is a wireless transceiver, configured to send and receive IR, RF, or other signals. Local transceiver 308 may be accessed by a remote control module (not shown in FIG. 3) for providing remote control functionality.

Also shown in FIG. 3 is an embodiment of MCDN performance monitoring probe device 322-1 (see also FIG. 7), which may be coupled to LAN 124. Probe device 322 may be implemented in various embodiments. As described above, MHD 125 may be configured to generate MHD output data (e.g., a multimedia display signal, such as video signal 352 and audio signal 354) in response to receiving MHD input data (e.g., network data, such as multimedia content 360) from the MCDN via GW 123. In FIG. 3, probe device 322-1 is implemented in series between network adapter 320 and GW 123, such that all MHD input data, such as multimedia content 360 and/or other network data intended for MHD 125, passes through probe device 322-1 to arrive at MHD 125. In this manner, probe device 322-1 may replicate or pass through MHD input data for MHD 125, while also buffering a copy of the MHD input data (see also FIG. 7). In other embodiments, the MHD input data may be replicated by another device, such as GW 123, and may be provided to probe device 322 and MHD 125 simultaneously using separate network links (see also FIG. 4).

In FIG. 3, probe device 322-1 is shown with a pair of connections for receiving MHD output data, represented by video signal 352 and audio signal 354. Although signals 352 and 354 are described above as analog signals, in various embodiments, MHD 125 may be configured to output digital multimedia signals, which represent corresponding audio and video output signals for display 126, which may be a digital display device. Accordingly, in certain embodiments, probe device 322 may be configured to capture analog and/or digital MHD output data, as will be described in further detail below (see also FIG. 7). In capturing MHD output data, such as video signal 352 and audio signal 354, probe device 322 may be configured to buffer MHD output data and/or analyze MHD output data for an error or undesired distortion of the multimedia signal, which shall be referred to herein as an "anomaly event." In various embodiments, probe device 322 may further be configured to control MHD 125 via local transceiver 308, for example, with a remote control signal or remote control commands (see also FIGS. 4, 7).

In summary, probe device 322 may be configured to buffer MHD input data and MHD output data, while monitoring MHD output data for an anomaly event. Once an anomaly event has been detected, probe device 322 may record (e.g., using a non-volatile storage medium) at least some of the buffered MHD input data and/or MHD output data, including data that were acquired prior to detection of the anomaly event, or prior to the anomaly event itself Analysis of the recorded MHD input data may reveal whether a source of the anomaly event lies with MHD 125 or with multimedia content 360. In this manner, probe device 322 may be configured to provide MHD input data and/or MHD output data that is usable to validate or certify the normal operation of MHD 125. The recorded data may also be sent "upstream" by probe device 322 to an MCDN server for additional investigation and analysis (see also FIG. 4). Probe device 322 may be further configured to send a notification of a detected anomaly event, for example, via email or another electronic means to a network administrator or technical support resource (not depicted).

Analysis of an anomaly event, performed by probe device 322 and/or application server 150, may include characterizing the anomaly event using the recorded MHD output data. The anomaly event may correspond to or represent a video distortion event, an audio distortion event, a pixelation error event, an MHD failure event, or a combination thereof. A video distortion event may represent a loss or freeze of a video frame, or another distortion in the image portion of the video data. An audio distortion event may represent a loss or another distortion in the audio portion of the video data (i.e., the soundtrack). A pixelation event may represent a loss in resolution for at least some of the image portion of the video data. An MHD failure event may represent a system failure of the MHD resulting in MHD output data that is not generated in response to the MHD input data. FIG. 3 thus depicts a configuration for implementing probe device 322 to improve downstream performance in MCDN 100 by being able to analyze downstream multimedia data both before and after processing by MHD 125. Probe device 322 provides a portable monitoring device that enables field testing of multimedia content to verify the functionality of MHD 125 or identify MHD 125 as a source of one or more issues.

Figure 4:
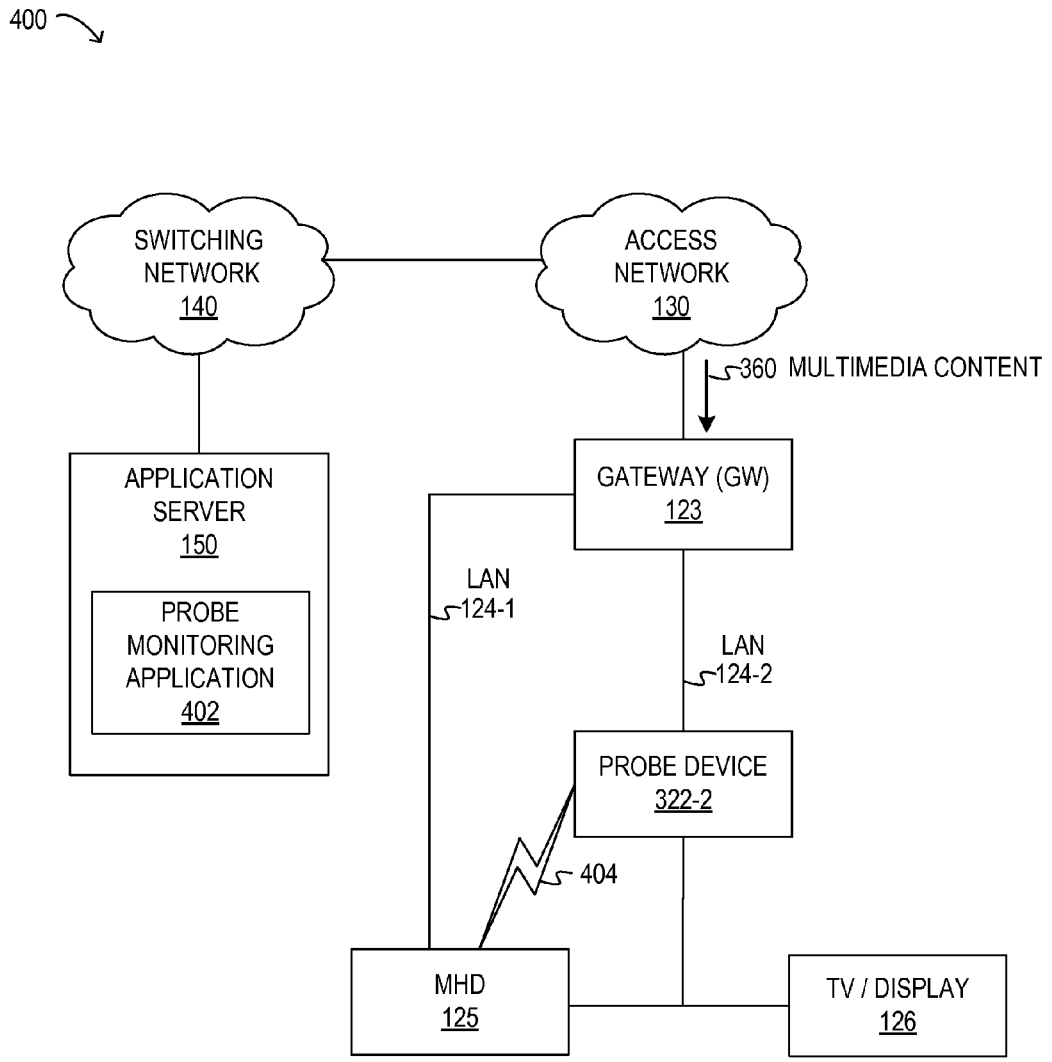
FIG. 4 is a block diagram of selected elements of an embodiment of a multimedia handling device monitoring system.

Turning now to FIG. 4, a block diagram of selected elements of an embodiment of MHD monitoring system 400 is depicted. It is noted that like numbered elements in FIG. 4 represent components discussed above with respect to FIGS. 1-3. MHD monitoring system 400 represents an exemplary architecture for monitoring MHD 125 as a component of MCDN 100, as described above (see also FIGS. 1, 3). In various embodiments, certain elements in MHD monitoring system 400 may be omitted or rearranged to perform interactive home monitoring.

In FIG. 4, MHD monitoring system 400 is shown including certain elements of CPE 122 (see also FIG. 3). As represented in FIG. 4, MHD 125, display 126, GW 123, probe device 322, and LAN 124 may represent elements of CPE 122 that are configured for use with MCDN 100 (see FIGS. 1-3). As shown in FIG. 4, MHD 125 is coupled to GW 123 via LAN 124-1, while probe device 322-2 is coupled to GW 123 via LAN 124-2. In such a configuration, GW 123 may replicate network data intended for MHD 125 (i.e., MHD input data via LAN 124-1), and deliver a copy of such network data to probe device 322-2 via LAN 124-1. In this manner, probe device 322-2 may independently receive and buffer MHD input data. It is noted that in certain embodiments, a probe device 322 may be configured in a pass-through configuration with respect to MHD 125 and LAN 124, as described previously (see also FIG. 3, probe device 322-1). Probe device 322-2 is also shown with a connection to receive MHD output data, where MHD 125 sends MHD output data to display 126. As noted above, MHD output data may be received by probe device 322-2 in analog and/or digital form. Probe device 322-2 may accordingly buffer MHD output data, for example using audio/video signal grabber 712 (see FIG. 7), and scan the buffered MHD output data for the occurrence of an anomaly event.

Figure 7:
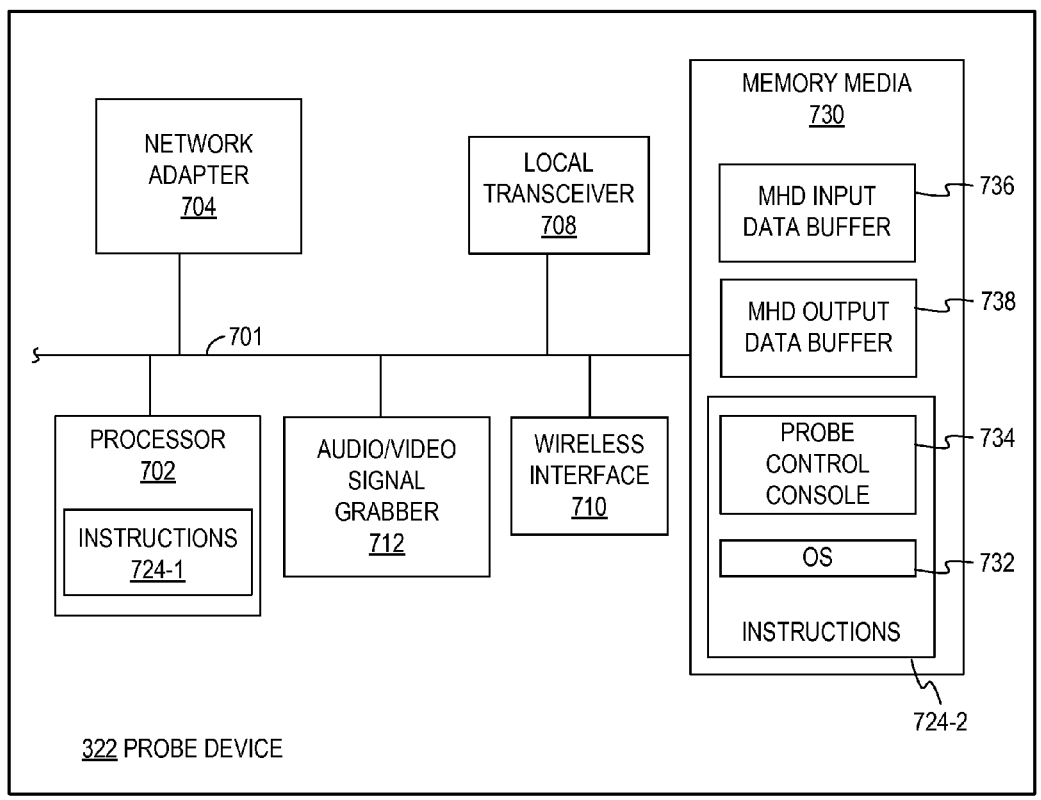
FIG. 7 is a block diagram of selected elements of an embodiment of a probe device for multimedia handling device monitoring.

When LAN 124 includes wireless communication links, probe device 322 may be configured to wirelessly receive MHD input data via a wireless interface (see FIG. 7). In certain embodiments, MHD 125 may be configured to provide MHD output signals to display 126 in wireless form, which probe device 322 may also be configured to receive. It is also noted that, while MHD 125 is shown in FIGS. 3 and 4 associated with one instance of probe device 322, in particular embodiments, probe device 322 may be configured to capture MHD input data and MHD output data for multiple instances of MHD 125. For example, when an MCDN user is equipped with multiple instances of MHD 125/display 126 at the MCDN client premises, probe device 322 may capture MHD input data via LAN 124, while capturing MHD output data wirelessly from one or more instances of MHD 125. In this manner, MHD monitoring system 400 may be configured to monitor multiple instances of MHD 125 using a single instance of probe device 322.

Also shown in FIG. 4, probe device 322-2 may further communicate with MHD 125 via remote control link 404, which may represent remote control commands and/or messages exchanged between local transceiver 308 (see FIG. 3) and local transceiver 708 (see FIG. 7). Probe device 322-2 may accordingly be configured to send remote control commands to MHD 125 and then monitor MHD output data for conformance with an expected response to the remote control commands.

Additionally application server 150 may host probe monitoring application 402, representing an MCDN server application for receiving data from a plurality of MCDN clients 120. For example, probe monitoring application 402 may be configured to receive MHD input data and MHD output data associated with an anomaly event at a particular MHD 125. In certain embodiments, probe monitor 150 may be configured, based on the received data, to certify that MHD 125 is operating normally and/or that MHD input data (i.e., multimedia content 360, see FIG. 3) was properly provided to MHD 125. Still further, when an indication of the anomaly event is detected in either MHD input data or MHD output data, probe monitoring application 402 may be configured to perform additional analyses or forensic investigation of recorded data to determine an origin or a cause of the anomaly event. For this purpose, probe monitoring application 402 may be configured to obtain additional data from other sources, such as monitoring systems for access network 130 and/or switching network 140.

In operation of MHD monitoring system 400, an MCDN user may operate MHD 125 to receive multimedia content 360, which arrives as MHD input data to probe device 322 and MHD 125. MHD 125 may generate MHD output data in response to receiving the MHD input data, and send the MHD output data to display 126. Audio and video signals included in the MHD output data may then be output by display 126 to the MCDN user. During normal operation, probe device 322 may continuously capture MHD input data and MHD output data in respective buffers, which are configured to store a predetermined amount of data. For example, MHD input data may be captured in a first data buffer for network data, while MHD output data may be captured in a second data buffer for multimedia data. The continuous capture may overwrite the oldest data in the respective buffers, which may be sized according to their respective payloads and data rates. In this manner, probe device 322 may record a portion/or historical interval of MHD input data and MHD output data e.g., an interval in the range of approximately 1 second to 60 seconds. It is noted that the physical location of the buffers may be different in various embodiments. In certain embodiments, probe device 322 may include the respective buffers internally (see FIG. 7). In other embodiments, at least a portion of the buffered data may be buffered external to probe device 322. It is noted that probe device 322 and/or application server 150 may be configured to monitor and adjust parameters associated with the buffering of MHD input data and MHD output data (e.g., how much data to buffer in terms of age, amount of data, or a combination thereof). During operation of MHD 125, when no anomaly event occurs, the buffered MHD input data and MHD output data may serve as evidence to certify or authenticate that MHD 125 is operating normally.

At some point during operation of MHD 125, an anomaly event may occur and may be detectable in the buffered MHD output data. A freeze frame event, for example, may be detected when all or a portion of a displayed image remains static or substantially static for a predetermined duration. Other types of anomaly events may be detected using appropriate algorithms. Probe device 322 may respond to the anomaly event by recording at least some of the buffered MHD input data and at least some of the MHD output data. In this manner, the immediate history of the MHD input data and the MHD output data prior to the anomaly event may be recorded. The MHD input data may be analyzed for an indication of the anomaly event. When an indication of the anomaly event is discovered in the recorded MHD input data, it may be inferred that at least a partial cause of the anomaly event occurred at LAN 124 or upstream thereof with respect to MCDN 100 (see FIG. 1). In certain instances, the entire anomaly event may be attributable to the indication in the recorded MHD input data, such that MHD 125 may be certified as operating normally. When no indication of the anomaly event is discovered in the recorded MHD input data, it may be inferred that the MCDN properly provided the MHD input data to MHD 125, and may further suggest that the origin of the anomaly event is associated with MHD 125. For example, when probe device 322 detects an anomaly event, probe device 322 may determine, from its buffered data, whether the anomaly was present in the MHD input data (i.e., the audio and video packets received by MHD 125) and/or present in the MHD output data (i.e., the data sent to TV/display 126 by MHD 125). By buffering, comparing, and analyzing the MHD input and output data, probe device 322 is configured to determine the culpability of CPE 122, including MHD 125, for any anomalies that occur. It is noted that probe device 322 may send buffered and/or recorded MHD input data and MHD output data to application server 150, including results of analyses and determinations made by probe device 322.

In further operation of MHD monitoring system 400, probe monitoring 402, along with probe device 322, may also represent a facility usable by service provider 121 for certain operational purposes in providing service via MCDN 100 (see FIG. 1). For example, multimedia content 360 may include advertisements for which service provider 121 receives corresponding revenue, subject to providing the advertisements to MCDN users via MHD 125. Service provider 121 may thus use MHD monitoring system 400 to monitor MHD output data and thus validate that the desired advertisements were indeed properly displayed by MHD 125. In a similar example, MHD monitoring system 400 may be used by service provider 121 to monitor MHD output data and thereby enforce terms of digital rights management (DRM) agreements for multimedia content 360, such as, for VOD programs. Furthermore, MHD monitoring system 400 may be valuable to service provider 121 in providing network service or responding to service requests by MCDN users. In particular, the remote monitoring capabilities of MHD monitoring system 400 may enable service provider 121 to forego costly on-site visits to the premises of MCDN clients 120, while providing improved debugging and remediation services for reported customer issues associated with MHD 125. Still further, MHD monitoring system 400 may enable service provider 121 to monitor continuously the performance of MCDN 100 and MHD 125, and may provide valuable information for characterizing network performance and/or for predictive purposes, such as, estimating when a slow degradation of performance will reach a critical value.

Figure 5:
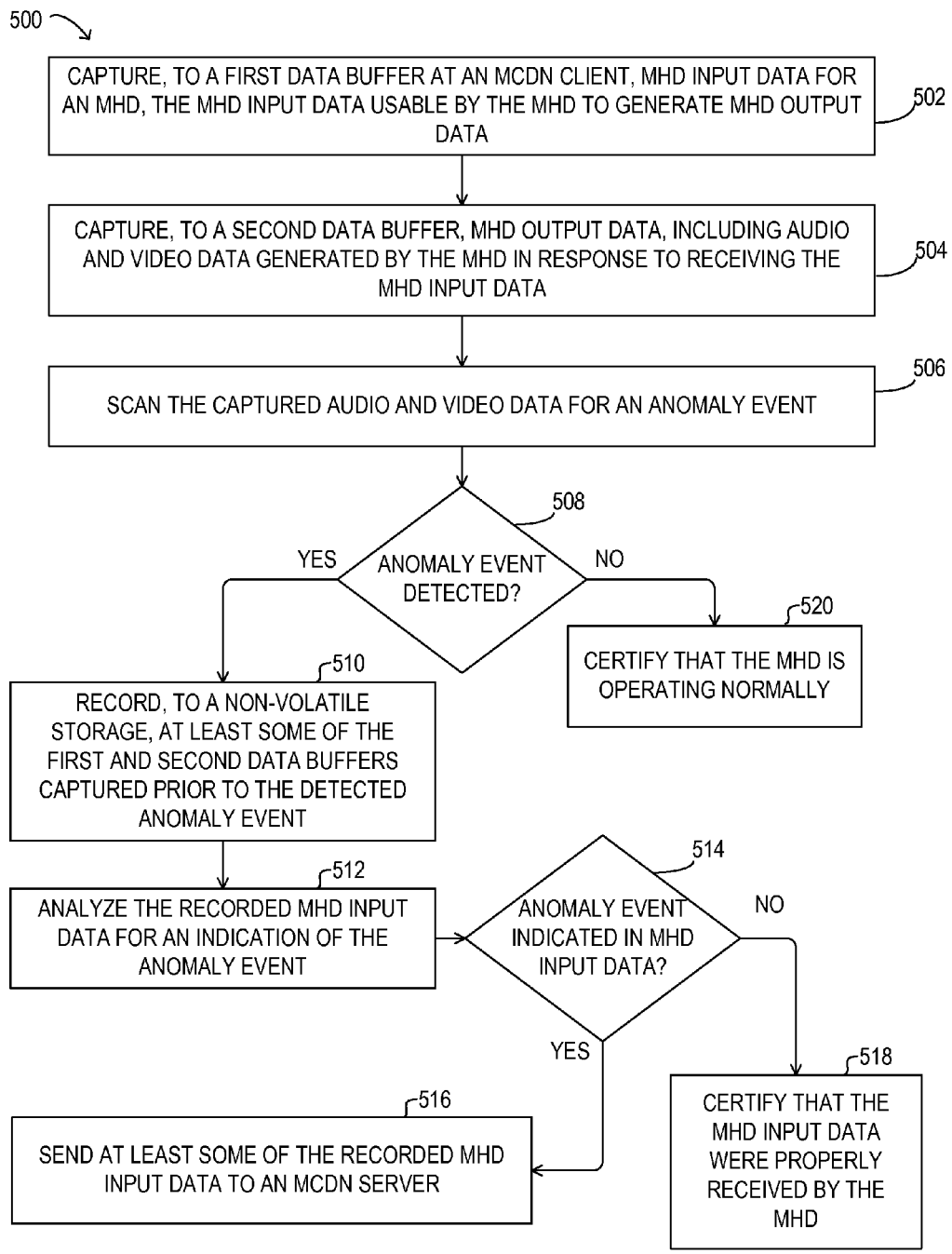
FIG. 5 illustrates an embodiment of a method for multimedia handling device monitoring.

Turning now to FIG. 5, elements of an embodiment of a method 500 for MHD monitoring are illustrated in flow chart form. In some embodiments, method 500 may be performed by probe device 322 (see FIGS. 3, 4, 7) in conjunction with MHD monitoring system 400 (see FIG. 4). Method 500 may also be associated with functionality provided by probe monitoring application 402 executing on application server 150 (see FIG. 4). It is noted that certain operations described in method 500 may be optional or may be rearranged in different embodiments.

In method 500, MHD input data may be captured at an MCDN client and stored to a first data buffer, while the MHD input data may be usable by the MHD to generate MHD output data (operation 502) (i.e., the probe device buffers and monitors the MHD input and MHD output information passively or without altering its suitability for conveying the applicable content. The MHD input data may represent packetized network data streamed to the MHD by an MCDN server. The first data buffer may be a buffer for the packetized network data. MHD output data may be captured to a second data buffer, while the MHD audio data may include audio and video data generated by the MHD in response to receiving the MHD input data (operation 504). The MHD output data may be obtained by obtaining an audio and a video signal generated by the MHD for display on a display device. It is noted that the second data buffer may be a buffer for the audio and video data. The first data buffer and the second data buffer may be synchronized, for example, by identifying video image frames or by a time stamp. The captured audio and video data may be scanned for an anomaly event (operation 506). The scanning may be performed on the second data buffer (i.e., MHD output data). Specific parameters for characterizing the anomaly event and/or for detecting the anomaly event may be predefined and used during the scanning. A determination may then be made whether the anomaly event is detected (operation 508). The determination may include a determination of a time and a duration of the anomaly event, which may be expressed in terms of video frames.

When the result of operation 508 is NO, then no anomaly event was detected and method 500 may certify that the MHD is operating normally (operation 520). When the result of operation 508 is YES, then an anomaly event was detected and at least some of the first and second data buffers may be recorded to a non-volatile storage, including portions captured prior to the detected anomaly event (operation 510). Then, the recorded MHD input data may be analyzed for an indication of the anomaly event (operation 512).

A determination may then be made whether the anomaly event is indicated in the MHD input data (operation 514). When the result of operation 514 is NO, method 500 certifies that the MHD input data were properly received by the MHD (operation 518). When the result of operation 514 is YES, then an indication of the anomaly event was detected in the MHD input data and at least some of the recorded MHD input data may be sent to an MCDN server (operation 516). In certain instances, an indication of the anomaly event in the MHD input data may suggest that the MHD was operating normally, and that the anomaly event was entirely caused by or present in the MHD input data.

Figure 6:
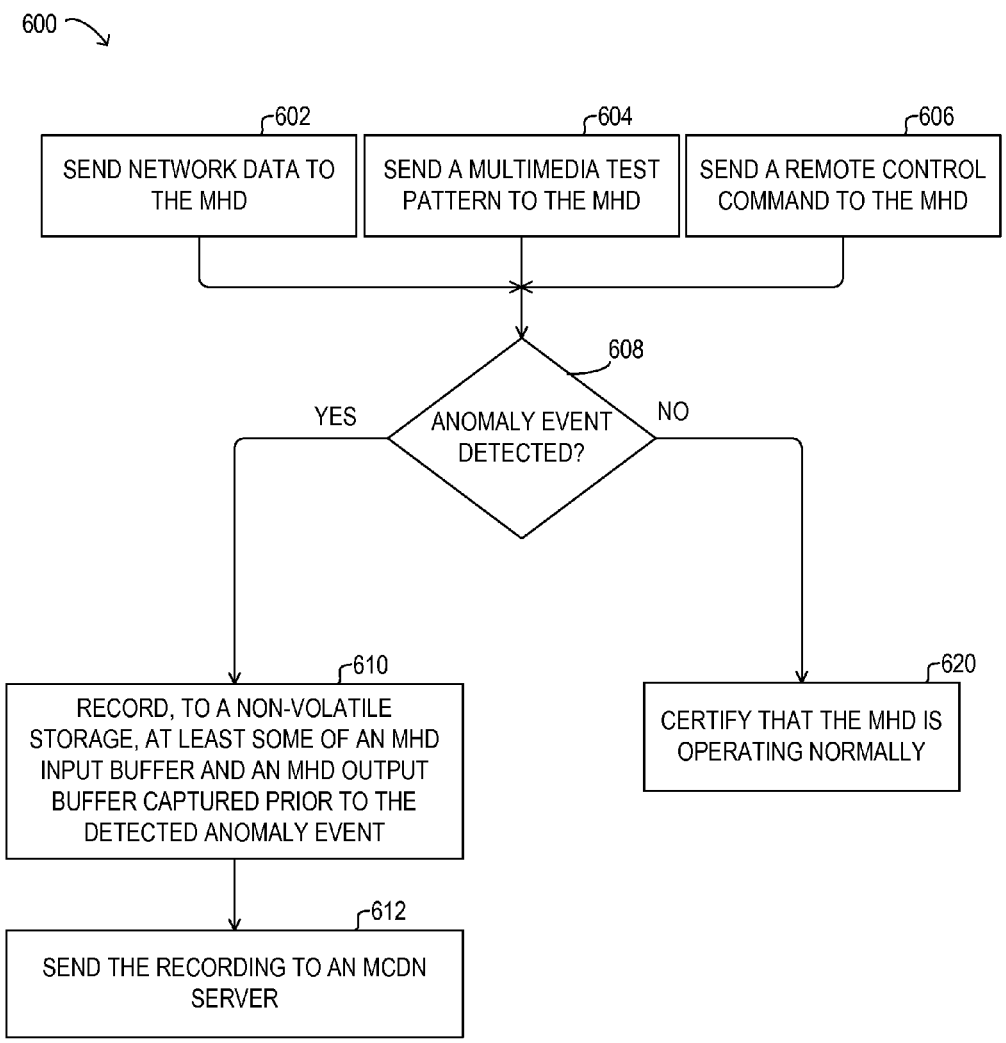
FIG. 6 illustrates an embodiment of a method for multimedia handling device monitoring.

It is noted that in certain embodiments of method 500, operations 512, 514 and 518 may be superseded by operation 516, such that an analysis of the MHD input data may be performed at the MCDN server (see also FIG. 6). In particular embodiments, MHD client data sent by the MHD to an MCDN server may also be buffered, for example, in operation 502. The MHD client data may represent user commands, such as requests for specific multimedia content, or other instructions and data sent by the MHD to an MCDN server. The recording in operation 510 may include the MHD client data. The recorded MHD client data along with the recorded MHD input data may be used to characterize the anomaly event. For example, in operation 512, the MHD client data and the MHD input data may be used to create a picture of communications between the MHD and an MCDN server, and thus determine which MHD input data are expected. The analysis in operation 512 may include determining when and how the MHD input data are different from what would be normally expected. Method 500 thus enables downstream detection of anomaly events and analysis of the downstream data provided to CPE 122 and MHD 125, to identify downstream resources as a cause of an anomaly event or to indicate downstream resources as not causing an anomaly event.

Turning now to FIG. 6, an embodiment of method 600 for MHD monitoring is illustrated in flow chart form. In one embodiment, method 600 may be performed by probe device 322 (see FIGS. 3, 4, 7) in conjunction with MCDN 100 and MHD monitoring system 400 (see FIGS. 1, 4). Method 600 may also be associated with functionality provided by probe monitoring application 402 executing on application server 150 (see FIGS. 1, 4). It is noted that certain operations described in method 600 may be optional or may be rearranged in different embodiments.

Method 600 may begin by causing the MHD to receive MHD input data by one or more of three operations. Network data may be sent to the MHD (operation 602). The network data may represent MCDN multimedia content received via the MCDN. A multimedia test pattern may be sent to the MHD (operation 604). The multimedia test pattern may include a known data pattern from which the MHD is expected to generate expected MHD output data. The multimedia test pattern may be generated by probe device 322 or received by probe device 322. A remote control command may be sent to the MHD (operation 606). The remote control command may be selected to cause the MHD to perform an expected action, resulting in an expected MHD output data. A determination may then be made whether the anomaly event is detected (operation 608). The determination in operation 608 may be made in response to any one or more of operations 602, 604, and 606. It is noted that in certain embodiments, method 600 may repeat any one or more of operations 602, 604, and 606, along with operation 608, for example, to perform an MHD diagnostic or test sequence. When a multimedia test pattern is sent to the MHD in operation 604, the determination in operation 608 may be made based on a scan of the MHD output data to verify the multimedia test pattern, or a representation thereof. When a remote control command is sent to the MHD in operation 606, the determination in operation 608 may be made based on a scan of the MHD output data to verify an expected response to the remote control command.

When the result of operation 608 is NO, then no anomaly event was detected and method 600 may certify that the MHD is operating normally (operation 620). When the result of operation 608 is YES, then an anomaly event was detected and at least some of an MHD input buffer and an MHD output buffer may be recorded to a non-volatile storage, including portions captured prior to the detected anomaly event (operation 610). Then, the recording may be sent to an MCDN server (operation 612). The MCDN server may perform further analysis on the recorded data. It is noted that the MCDN server may be configured to receive recorded data from a plurality of MCDN clients 120.

Referring now to FIG. 7, a block diagram illustrating selected elements of an embodiment of probe device 322 are presented. In some embodiments, probe device 322 may represent an embedded device that is installed at the premises of MCDN client 120 (see FIGS. 3, 4). Probe device 322 may be installed in a manner that is suitable for capturing MHD input data and MHD output data, and for sending remote control commands to MHD 125. The elements shown included in probe device 322 may be physically implemented as a single, self-contained device. In certain implementations, probe device 322 may alternatively be implemented as a portable or stand alone device that is physically separated from, but coupled to MHD 125 and CPE 122. It is noted that probe device 322 may include additional components, such as a power supply and a cooling element, which have been omitted from FIG. 7 for clarity. As shown in FIG. 7, probe device 322 may operate in conjunction with MHD 125 (see also FIGS. 3, 4) to execute the methods and operations described herein.

In the embodiment depicted in FIG. 7, probe device 322 includes processor 702 coupled via shared bus 701 to storage media collectively identified as memory media 730. Probe device 322, as depicted in FIG. 7, further includes network adapter 704 that interfaces probe device 322 to MHD 125, and through which probe device 322 may communicate with other elements of MCDN 100 (see FIG. 1) via LAN 124. It is noted that, in certain embodiments, network adapter 704 may represent multiple adapters and/or network ports, for example, to support a pass-through connection between probe device 322 and MHD 125, as mentioned above (see also FIG. 3). Also shown coupled to shared bus 701 are local transceiver 708, wireless interface 710, and audio/video signal grabber 712.

In certain implementations, probe device 322 may include a display and/or a display adapter (not shown in FIG. 7). The display may be implemented as a TV, a liquid crystal display screen, a computer monitor, or the like. The display may comply with a display standard for computer monitors and/or television displays. Standards for computer monitors include analog standards such as VGA, XGA, etc., or digital standards such as DVI and HDMI, among others. A television display may comply with standards such as NTSC, PAL, or another suitable standard.

Local transceiver 708 represents an interface of probe device 322 for communicating with external devices, such as MHD 125, for example, by emulating remote control 128 or another remote control device. Local transceiver 708 may provide a mechanical interface for coupling to an external device, such as a plug, socket, or other proximal adapter. In some cases, local transceiver 708 is a wireless transceiver, configured to send and receive IR or RF or other signals. Local transceiver 708 may be accessed by probe control console 734 for providing remote control functionality.

Wireless interface 710 provides connectivity to any of a number of wireless networks, including certain implementations of LAN 124 (see FIG. 3). As noted previously, wireless interface 710 may also be used to wirelessly receive MHD output data from one or more instances of MHD 125. Audio/video signal grabber 712 (also referred to as a 'frame grabber') may represent a signal interface for receiving MHD output data from probe device 322. For example, audio/video signal grabber 712 may be configured to digitize and/or buffer audio and video signals generated by MHD 125 for display 126. It is noted that audio/video signal grabber 712 may be configured to receive and capture digital multimedia signals in various embodiments. It is further noted that audio/video signal grabber 712 may, in conjunction with wireless interface 710, be configured to capture and buffer MHD output data received wirelessly.

Memory media 730 encompasses persistent and volatile media, fixed and removable media, and magnetic and semiconductor media. Memory media 730 is operable to store instructions 724, data (such as MHD input data buffer 736 and MHD output data buffer 738), or both. Memory media 730 as shown may include sets or sequences of instructions 724-2, namely, an operating system 732, and probe control console 734. Operating system 732 may be a UNIX or UNIX-like operating system, a Windows® family operating system, or another suitable operating system. Instructions 724 may also reside, completely or at least partially, within processor 702 during execution thereof. It is further noted that processor 702 may be configured to receive instructions 724-2 from instructions 724-1 via shared bus 701.

Probe control console 734 may be configured to perform MHD monitoring, as described herein. Probe control console 734 may further be accessed remotely, for example using network adapter 704 and/or wireless interface 710, from another location via a network connection to perform MHD monitoring or view results of MHD monitoring. In given embodiments, probe control console 734 may enable probe device 322 to operate as an embedded controller without relying on user input for MHD monitoring. It is noted that probe control console 734 may execute certain methods and operations described herein, such as portions of method 500 (see FIG. 5) and/or method 600 (see FIG. 6), or other operations.

MHD input data buffer 736 may represent a first data buffer for capturing MHD input data, as described previously. MHD input data buffer 736 may be accessed by probe control console 732. MHD output data buffer 738 may represent a second data buffer for capturing MHD output data, as described previously. MHD output data buffer 738 may be accessed by probe control console 732. Certain portions of content in MHD input buffer 736 and/or MHD output buffer 738 may be recorded to a non-volatile storage media in response to detection of an anomaly event, according to the operations described herein. In certain embodiments, MHD input buffer 736 and/or MHD output buffer 738 may be accessed by probe monitoring 402 (see FIG. 4).

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A method, comprising:
buffering, in a first data buffer, inbound multimedia content including multimedia content inbound to a customer premises multimedia handling device;
buffering, in a second data buffer, outbound multimedia content outbound from the customer premises multimedia handling device, the outbound multimedia content including multimedia content generated by the customer premises multimedia handling device during processing of the inbound multimedia content; and
responsive to detecting an anomaly event in the outbound multimedia content, preserving inbound multimedia content corresponding to the outbound multimedia content that generated the anomaly event, wherein preserving includes recording, to non-volatile storage, at least some of the first data buffer and at least some of the second data buffer, wherein the recording includes recording inbound multimedia content and outbound multimedia content captured prior to said detecting of the anomaly event.

2. The method of claim 1, further comprising:
when no anomaly event is detected in the outbound multimedia content during a predetermined interval, indicating the multimedia handling device as operating normally.

3. The method of claim 1, further comprising:
analyzing the inbound multimedia content for an indication of the anomaly event in the inbound multimedia content; and
when the analyzing does not determine a cause of the anomaly event in the inbound multimedia content, certifying, based on inbound multimedia content, that the network data were properly provided to the multimedia handling device via the network.

4. The method of claim 1, wherein the outbound multimedia content includes video and audio data, and wherein the method includes:
characterizing the anomaly event using the recorded outbound multimedia content, wherein the anomaly event represents at least one of: a video distortion, an audio distortion, video freeze, a pixelation error, or a multimedia handling device failure.

5. The method of claim 4, wherein characterizing the anomaly event further comprises:
determining a time duration associated with the anomaly event.

6. The method of claim 1, further comprising:
buffering multimedia handling device client data sent by the multimedia handling device to a network server, wherein the recording includes the multimedia handling device client data; and
using the recorded multimedia handling device client data and the inbound multimedia content to characterize the anomaly event.

7. The method of claim 1, further comprising:
in response to detecting the anomaly event, sending an email notification.

8. A computerized probe device, comprising:
a processor coupled to a computer readable memory device;

a first network adapter to receive inbound multimedia content from a multimedia distribution network;
a second network adapter to send outbound multimedia content to a multimedia handling device;
a multimedia signal grabber for acquiring audio and video data; and
wherein the computer readable memory device includes stored, processor executable instructions that, when executed by the processor, cause the processor to perform operations comprising:
buffering, in a first data buffer, inbound multimedia content including multimedia content inbound to a customer premises multimedia handling device;
buffering, in a second data buffer, outbound multimedia content outbound from the customer premises multimedia handling device, the outbound multimedia content including multimedia content generated by the customer premises multimedia handling device during processing of the inbound multimedia content;
responsive to detecting an anomaly event in the outbound multimedia content, preserving inbound multimedia content corresponding to the outbound multimedia content that generated the anomaly event, wherein preserving includes recording, to non-volatile storage, at least some of the first data buffer and at least some of the second data buffer, wherein the recording includes recording inbound multimedia content and outbound multimedia content captured prior to said detecting of the anomaly event; and
analyzing the outbound multimedia content for an anomaly event selected from: a video distortion, an audio distortion, video freeze, a pixelation error, and a multimedia handling device failure.

9. The probe device of claim 8, wherein the operations include:
responsive to detecting an anomaly event in the outbound multimedia content, recording, to a non-volatile storage, at least some of the second data buffer and at least some of the multimedia display data buffer captured prior to detecting the anomaly event; and
when no anomaly event is detected in the outbound multimedia content data during a predetermined interval, certify, based on the outbound multimedia content, that the multimedia handling device is operating normally.

10. The probe device of claim 8, further comprising:
a local transceiver;
wherein the operations include instructions executable by the processor to:
send a remote control command to the multimedia handling device via the local transceiver; and
analyze the outbound multimedia content for a response to the remote control command.

11. The probe device of claim 8, further comprising:
a wireless interface;
wherein the operations include operations to:
receive, via the wireless interface, multimedia display signals from a plurality of multimedia handling devices; and
capture a respective plurality of audio and video data sets from the multimedia display signals corresponding to the plurality of multimedia handling devices.

12. The probe device of claim 9, wherein the operations include operations to:
determine a time duration associated with the anomaly event.

13. A computer readable memory device, including processor executable instructions that, when executed by the processor, cause the processor to perform operations comprising:
buffering, to a first data buffer at a network client premises, inbound multimedia content for a network multimedia handling device;
buffering, to a second data buffer, outbound multimedia content representing a multimedia output signal generated by the multimedia handling device in response to the multimedia handling device receiving the inbound multimedia content;
scanning the outbound multimedia content to detect an anomaly event; and
responsive to detecting the anomaly event in the outbound multimedia content, preserving inbound multimedia content corresponding to the outbound multimedia content that generated the anomaly event, wherein preserving includes recording, to non-volatile storage, at least some of the inbound multimedia content and at least some of the outbound multimedia content captured prior to the detecting.

14. The computer readable memory device of claim 13, further comprising instructions executable to:
analyze the inbound multimedia content for an indication of the anomaly event; and
when the inbound multimedia content does not reveal an indication of the anomaly event in the inbound multimedia content, certify, based on the inbound multimedia content, that the inbound multimedia content were properly provided to the multimedia handling device via the network.

15. The computer readable memory device of claim 13, wherein the operations include operations for:
when no anomaly event is detected in the outbound multimedia content, certifying, based on the outbound multimedia content, that the multimedia handling device is operating normally.

16. The computer readable memory device of claim 13, wherein the outbound multimedia content includes video and audio data, and wherein the operations include:
characterizing the anomaly event using the recorded outbound multimedia content, wherein the anomaly event represents at least one of: a video distortion, an audio distortion, video freeze, a pixelation error, or a multimedia handling device failure.

17. The computer readable memory device of claim 13, wherein the operations include:
sending the inbound multimedia content and the recorded outbound multimedia content to a network server.

18. The computer readable memory device of claim 13, wherein the operations include:
sending a multimedia test pattern to the multimedia handling device for generating a multimedia test signal by the multimedia handling device;
scanning the outbound multimedia content to verify the multimedia test pattern; and
when the multimedia test pattern is not verified, determining the anomaly event based on the multimedia test pattern.

19. The computer readable memory device of claim 13, wherein the operations include:
sending a remote control command to the multimedia handling device;
scanning the outbound multimedia content for an expected response to the remote control command; and when the expected response to the remote control command is not detected in the outbound multimedia content, determining the anomaly event based on the remote control command.

* * * * *